United States Patent [19]

Umasankar et al.

[11] Patent Number: 5,026,126
[45] Date of Patent: Jun. 25, 1991

[54] CAM ACTUATED TRACTION CONTROL SYSTEM APPARATUS AND METHOD

[75] Inventors: Guruswamy Umasankar, Sterling Heights; Alexander Kade, Grosse Pointe Woods; Alroy G. Fabris, Mt. Clemens, all of Mich.

[73] Assignee: General Motors Corporation, Detroit, Mich.

[21] Appl. No.: 416,245

[22] Filed: Sep. 29, 1989

[51] Int. Cl.⁵ ............................................. B60T 8/32
[52] U.S. Cl. .................................. 303/100; 188/162; 303/93; 303/119
[58] Field of Search ............... 188/162, 181 A, 181 R; 303/61, 91, 93, 100, 116, 115, 119, 110, 113; 180/197

[56] References Cited

U.S. PATENT DOCUMENTS

| | | |
|---|---|---|
| 2,270,586 | 1/1942 | Jahant et al. . |
| 3,747,990 | 7/1973 | Tanguy . |
| 3,790,225 | 2/1974 | Wehde .............................. 303/93 X |
| 3,942,843 | 3/1976 | Tobiasz . |
| 4,327,414 | 4/1982 | Klein .............................. 303/93 X |
| 4,717,211 | 1/1988 | Dittner . |
| 4,720,150 | 1/1988 | Heubner . |
| 4,726,549 | 2/1988 | Dittner et al. . |
| 4,765,689 | 8/1988 | Rudiger et al. . |
| 4,765,690 | 8/1988 | Rudiger et al. . |
| 4,784,244 | 11/1988 | Carre et al. ..................... 188/162 X |
| 4,822,114 | 4/1989 | Klein . |
| 4,848,848 | 7/1989 | Klein . |

FOREIGN PATENT DOCUMENTS

| | | |
|---|---|---|
| 0292648 | 11/1988 | European Pat. Off. . |
| 3001506 | 1/1981 | Fed. Rep. of Germany . |
| 3442503 | 5/1986 | Fed. Rep. of Germany . |
| 2202018 | 9/1988 | United Kingdom . |

*Primary Examiner*—Douglas C. Butler
*Attorney, Agent, or Firm*—Ernest E. Helms

[57] ABSTRACT

A traction control system (TC) pressure actuator is provided. The actuator includes a frame with a central bore fluidly exposed to a solenoid valve and to a vehicle wheel cylinder. A piston is slidably mounted within the bore having a contact surface and a first predetermined position within the bore. A power device is actuated by a controller. A cam moved by the power device has a ramp surface in contact with the piston contact surface. The position of the piston within the wheel cylinder is determined by the position of the cam.

11 Claims, 4 Drawing Sheets

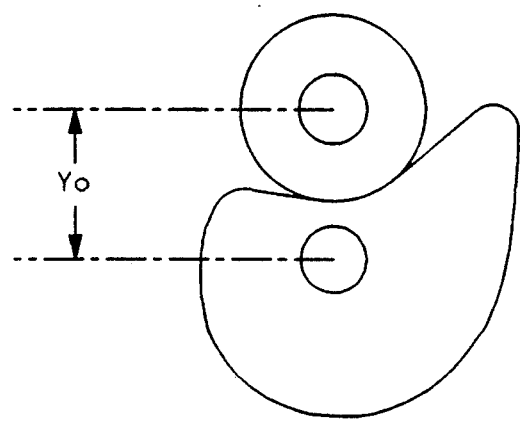
FIG.5
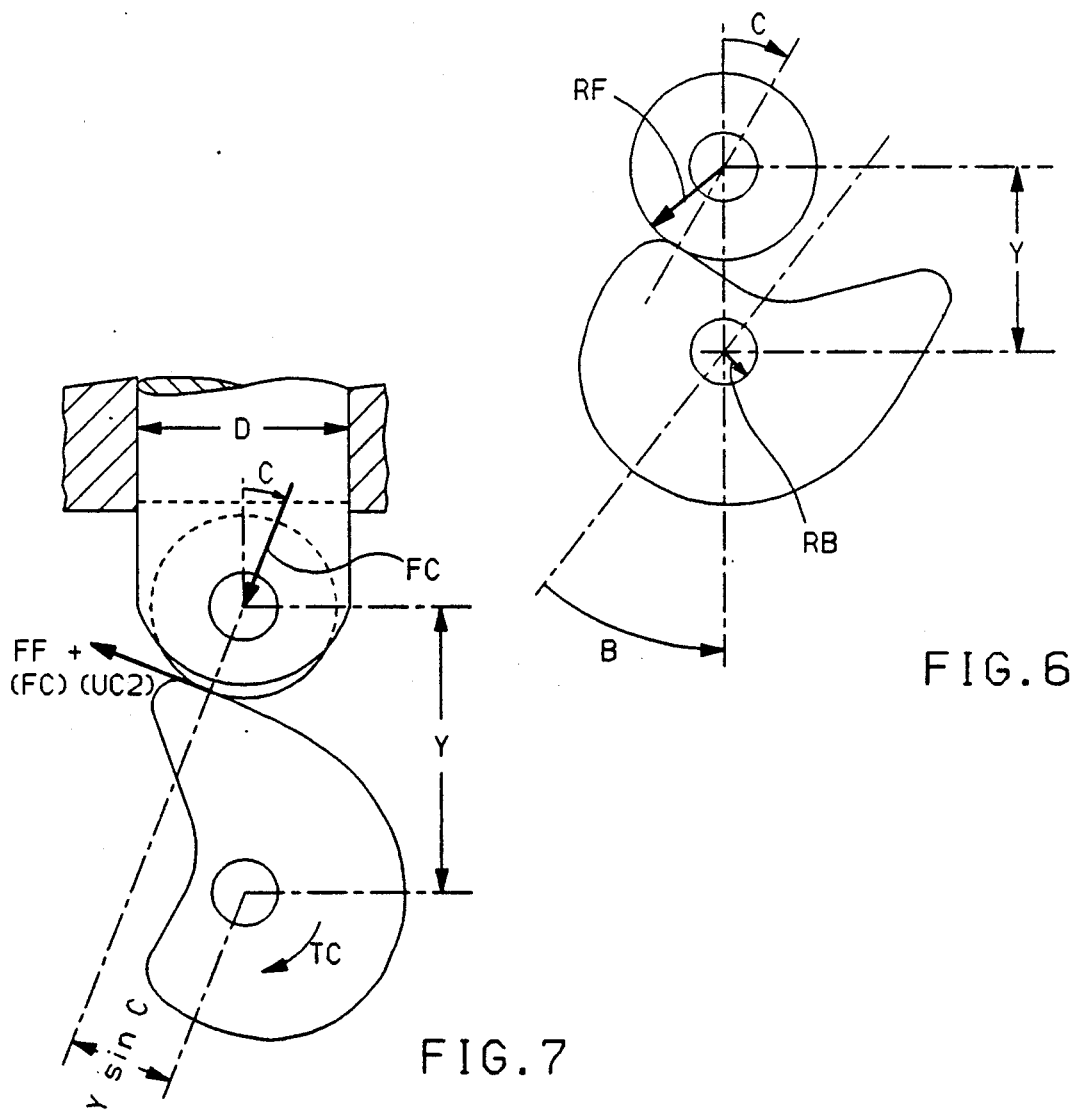
FIG.6
FIG.7

CAM ACTUATED TRACTION CONTROL SYSTEM APPARATUS AND METHOD

FIELD OF THE INVENTION

This invention relates to a method and apparatus to prevent wheel spin and provide optimal traction at each of the driven wheels of a vehicle when driving on slippery surfaces.

DISCLOSURE STATEMENT

To maximize the traction of a vehicle drive, it is sometimes necessary to retard the speed of the vehicle wheel to keep the wheel from spinning. Wheel spinning can often occur when a vehicle accelerates on a icy surface or when the vehicle undergoes high acceleration.

One method to prevent vehicle wheel spin is to retard torque output of the engine. One method to achieve the above is to reduce the number of active cylinders in the engine. Other methods are cutting off fuel to the engine or retarding engine spark timing. Reliance on engine output control in of themselves is disadvantageous in that the inertia of the drive train is still quite high after the initial action of the engine control. Therefore, torque levels of the drive wheels remain higher longer than desired even though the engine may have slowed down.

Still another disadvantage is that modulating engine timing or fuel supply can sometimes cause the engine to operate in a rough manner.

Still another disadvantage relying exclusively upon engine control to retard vehicle wheel spin, is that occasionally, especially on icy surfaces, two wheels on a common differential can have radically different rotational speeds. Therefore, reliance on engine torque retardation alone does not necessarily mean that the wheel whose rotational speeds needs to be lowered will be so in comparison with the other wheel on a common differential. Furthermore, reliance upon engine retardation alone lowers the maximum torque available to the other drive wheel (typically on dry pavement) which is not spinning.

To provide a better traction control system in addition to engine retardation, or if desired in exclusion of engine retardation, the brakes may be selectively utilized to restrain the wheel which is in the spinning condition.

One major method is to utilize a system where in a normal braking condition, the master cylinder delivers pressurized brake fluid to the brake cylinder. There is a solenoid valve between the master cylinder and the wheel cylinder. When a wheel spin condition is recognized by a wheel sensor, a traction control system controller will signal the solenoid valve to a closed position to isolate the master cylinder from the wheel cylinder. An independent source of pressurized fluid, typically a pump which feeds into a accumulator, is selectively connected with the wheel cylinder via a solenoid valve to apply the brakes to restrain rotation of the wheel. Another solenoid valve which is controlled by the controller will be selectively opened to relieve the brake fluid to a reservoir to provide modulation of the brake pressure to the wheel to prevent lock up of the same.

The above system requires at least three single action solenoid valves for each separate wheel traction control is desired upon. One to provide isolation between the master cylinder and wheel cylinder, another to allow pressure from the accumulator to pressurize the brakes, and yet another solenoid valve to allow release of the pressure to a reservoir. Typically a dual acting solenoid can be utilized for one of the valves, however, solenoid valves tend to be the major cost item for a traction control system of this type. On a four wheel drive vehicle up to twelve solenoid valves may be required. Secondly, to ensure very fast response, the capacity of the accumulator and pump needed for such a traction control system, especially when utilized in a four wheel drive vehicle, can be very large indeed.

In an alternative method, a solenoid still isolates the master cylinder from the wheel cylinder. To selectively pressurize the brakes there is an electric motor which is gearably connected with a drive screw mechanism which is threadably engaged with a piston slidably mounted in a cylindrical fluid actuator. A disadvantage of the above-noted system is that its performance characteristics are not ideally suited for the typical vehicle braking system whose pressure/volume relationship is nonlinear. That is, at the lower pressure stages due to the volumetric compliance of the brake system, a large initial displacement must occur before the brake system will be pressurized. In the electric motor/drive screw mechanism displacement will be a direct function of motor rotation. Therefore response for initial displacement can be retarded or motor size may have to be larger than desired. Also, at the higher pressure stages, a higher motor current will be required since displacement (which is constant function with relationship to motor rotation) will be too fast in relationship to the pressure buildup into brake system since compliance not as great a factor at the brake system maximum pressure In other words, there is a need for a variable mechanical ratio in the drive train to better match the torque characteristics of the electric motor with pressure volume relationship of the vehicle braking system.

SUMMARY OF THE INVENTION

To provide an alternative actuator for pressurizing the brakes of a traction control system, to the systems aforedescribed and to overcome certain disadvantages associated therewith the present invention is brought forth.

The present invention provides a traction control brake fluid actuator apparatus and method of utilization thereof which utilizes a cam which acts against a piston slidably mounted within a cylinder to modulate the pressure within the wheel brake when the braking system is in a traction control mode. The use of the cam offers the opportunity to vary the mechanical ratio over different ranges of the piston stroke. The cam profile is designed and optimized to fit the pressure versus volume relationship of a given brake cylinder (brake cylinder as used in this application can relate to drum or caliper and disc type brakes). The cam of the present invention has a low mechanical ratio at the lower range of the piston stroke where the brake pressures are lower, and a high mechanical ratio at the upper range of the piston stroke when the brake pressures are higher. The cam profile offers the advantages of aggressive performances at lower brake pressure due to the lower mechanical ratio (higher piston speeds), thereby giving high initial volume displacement. Additionally, the motor torque required to actuate the piston at the maximum brake pressure is lowered due to the high mechanical ratio at the high pressures. The above results in lower peak current drawn on the vehicle's electrical system and potentially lower cost of power electronics. Additionally, the relationship between brake pressure and motor torque current is nonlinear by virtue of the cam profile design. The nonlinear relationship better matches the control algorithm described in U.S. Pat. No. 4,673,225, commonly assigned, and provides optimal system performance.

It is an object of the present invention to provide a cam actuated actuator apparatus and method of utilization thereof for a vehicle traction control system.

Further objects, desires and advantages of the present invention can become more apparent to those skilled in the art as the nature of the invention is better understood from the accompanying drawings and a detailed description.

BRIEF DESCRIPTION OF THE DRAWINGS

FIGS. 5 through 9 are schematic views illustrating design considerations;

DETAILED DESCRIPTION OF THE DRAWINGS

Figure 1:
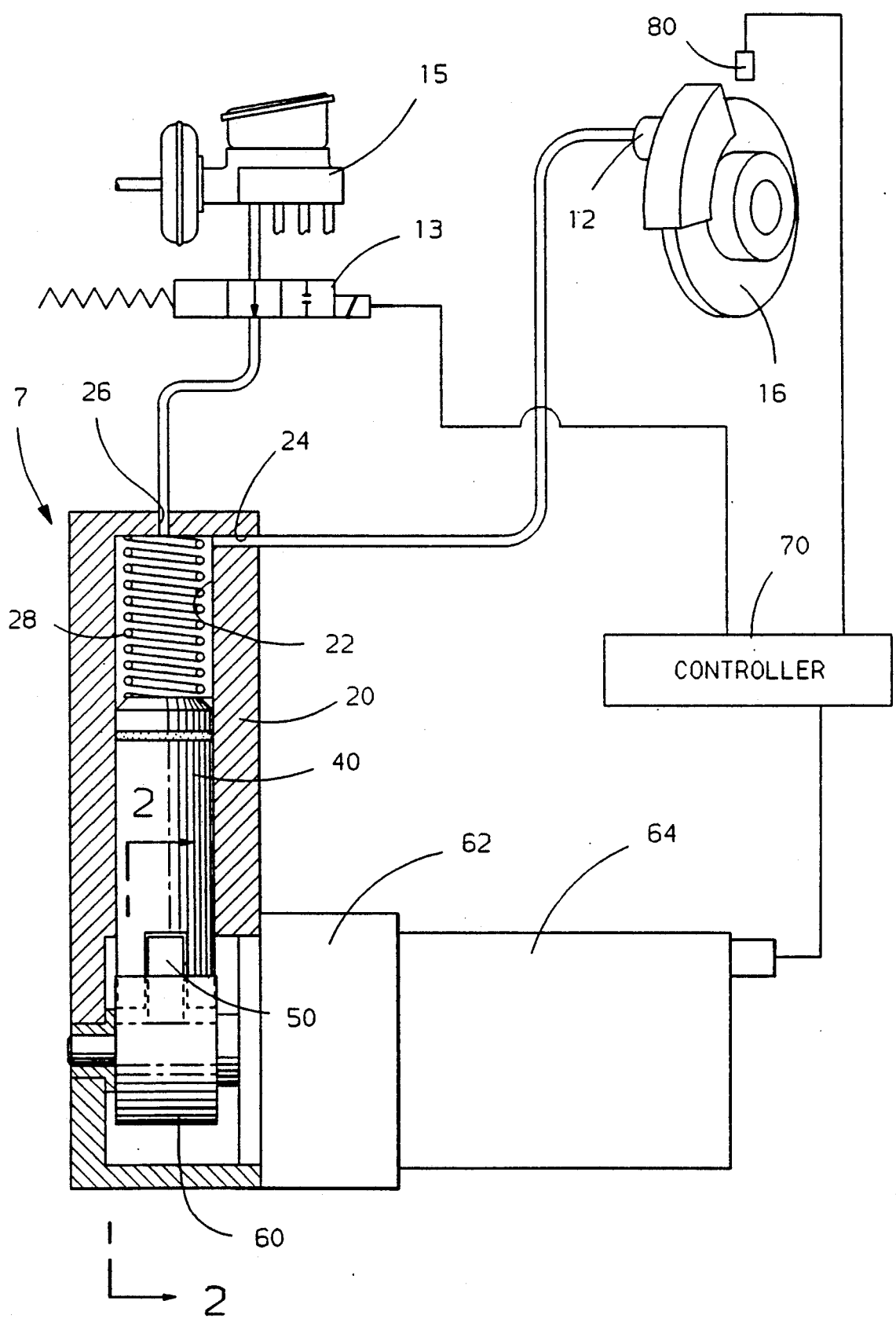
FIG. 1 is a sectional view of a preferred embodiment actuator according to the present invention.
Figure 2:
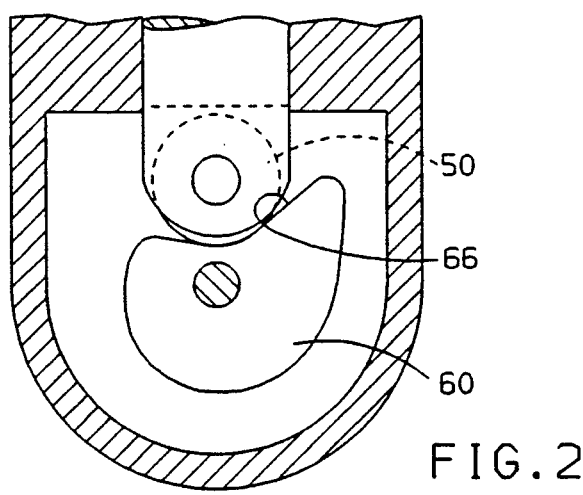
FIG. 2 is a view taken along line 2—2 of FIG. 1.

The present invention is shown in detail on FIGS. 1 and 2, and functions in the following manner. (Note: the following description applies to an automobile with two driven wheels. But the method and apparatus are applicable to automobiles with more than two driven wheels (e.g. 4-wheel drive). A traction control actuator 7 (TC actuator) device such as the one shown in FIGS. 1 and 2 is required for each driven wheel assuming that wheel is on an axle with a differential).

During normal operation of the vehicle, normal braking takes place through a normally open solenoid valve 13. Brake fluid from the master cylinder 15 causes a wheel cylinder 12 to actuate and apply a braking force to the wheel(s) (or wheel rotor 16) through the normally open solenoid valve 13.

An actuator is provided having a housing or frame 20 with a central bore 22 and a port 24 for fluid connection with the wheel cylinder and a port 26 for fluid connection with the master cylinder via the solenoid valve.

A piston 40 is slidably mounted in the central bore 22 of the frame of the TC cam actuator. The piston is at its fully retracted bottom dead center (BDC) position during normal operation. The brake fluid pressure and the spring 28 force act on the piston and tends to push the piston 40 down. The piston has a contact surface provided by a roller 50. Contacting the roller is a rotary cam 60 which is connected with a gear box 62 torsionally connected with a motor 64 (power means). In normal operation, the roller is at the first predetermined BDC position in contact with a stop surface 66 of the cam 50. The piston 40 is held in position by the cam 50 at the BDC position. No power is supplied to the motor 64. In an embodiment not shown, the cam 60 will have studs projecting parallel to its axis of rotation that will contact stop surfaces fixed with respect to the frame 20 to define the limits of angular rotation of the cam.

In the TC mode of operation when the engine torque is such that the drive torque limit of either of the two driven wheels is exceeded, then that particular wheel starts to spin. This wheel spin condition is detected by the TC controller 70 using the wheel speed sensor 80. The solenoid valve is closed and the motor is actuated.

The motor 64 rotates the cam 60 through the reduction gear reduction box 62. The cam 60 rotates pushing the piston 40 up quickly into the bore 22. The displaced brake fluid flows into the wheel brake cylinder 12 and moves the brake pads (not shown) towards the rotor/drum 16. The pads move to take up the clearance gap ("initial volume") and touch the rotor/drum. Braking torque is applied and the wheel begins to decelerate and the wheel spin decreases. The cam profile (shown in FIG. 3) is designed with a high initial lift characteristic causing the piston to move quickly. Since the piston moves quickly to displace the "Initial Volume" (volume of brake fluid required to cause the brake pads to touch the rotor/drum), braking starts before the wheel spin RPM becomes large and therefore the wheel spin is quickly controlled. The drive torque supplied to the other driven wheel starts to increase.

The motor current is then modulated by the TC controller 70 and this regulates the braking torque on the wheel is that started to spin and controls the wheel spin. The drive torque on the other driven wheel increases by the amount of the braking torque applied on the wheel that started to spin and up to the level that is set by the engine torque. If the engine torque is high enough that the other driven wheel starts to spin, then the TC controller uses another TC actuator device to control the wheel spin in a similar manner. TC controller 70 may also use a throttle control device (not shown) to reduce the engine torque.

At the end of the TC mode of operation (no wheel spin with no braking) the motor 64 is reversed, the cam 60 is rotated returning the piston down 40 the BDC piston. The spring 28 is a light spring that overcomes the seal friction and returns the piston back to its BDC.

Figure 3:
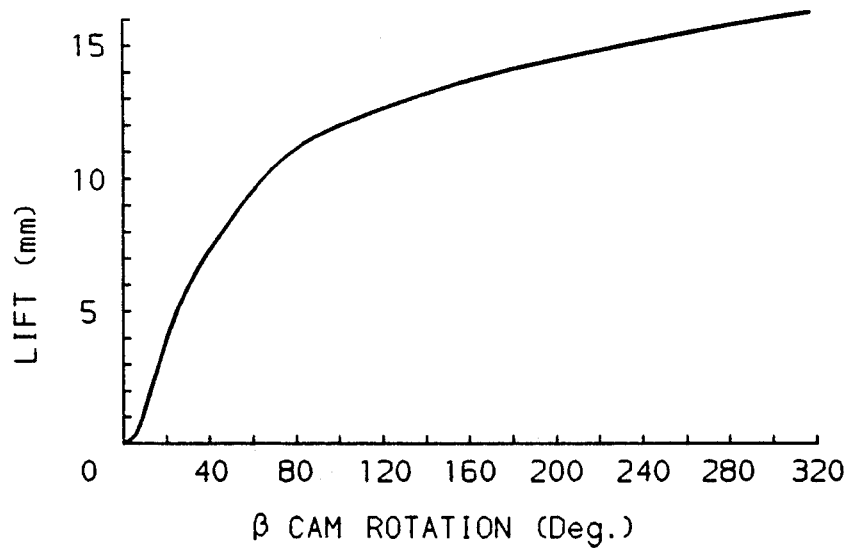
FIGS. 3 and 4 are views illustrating the relationships of cam lift versus rotation and brake system pressure versus volume displacement respectively.

The cam profile is shown in FIG. 3. The TC controller 70 uses the wheel speed sensor and motor current as inputs to modulate the brake pressure and control wheel slip. The relationship between the motor current and the brake pressure is therefore a critical characteristic of the mechanical system. The cam profile, shown in FIG. 3, is designed to better match the control algorithm (U.S. Pat. No. 4,673,225 awarded to GM in June 1987) that is used in the TCS controller and the pressure versus volume profile (see FIG. 4) of the car brake caliper for optimal system performance.

Figure 4:
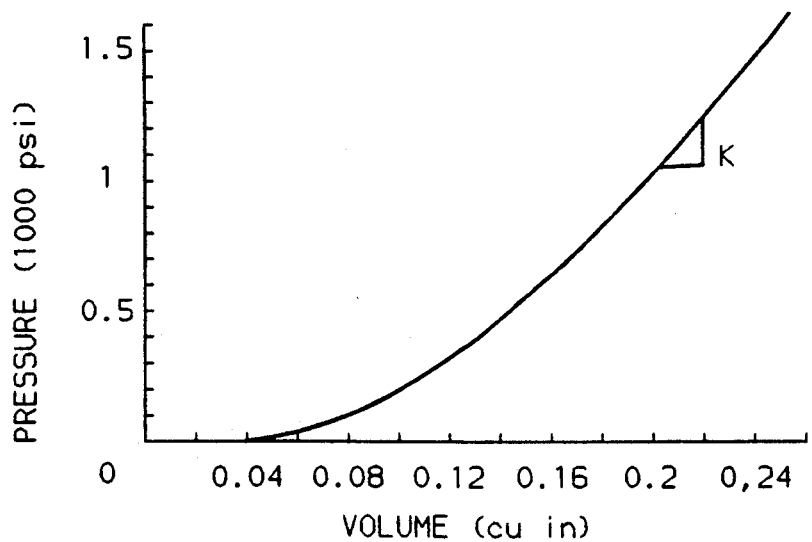

In an alternate embodiment (not shown), actuator frame bore 22 is also fluidly connected with the master cylinder 15 via another line. Inserted within the line is a check valve allowing flow only towards the actuator 7. Therefore, when the actuator is in a TC mode, the vehicle operator can override the system by applying the brakes. The above-described overriding function can also be accomplished by using a vehicle brake light circuit to also activate the solenoid valve 13 to an open position restoring fluid communication between the master cylinder 15 and the actuator bore 22. Referring to FIG. 4, for a typical braking system the relationship between brake pressure (P in psi) and the volume (V in inch$^3$) is $P = 20669 (V-0.035)^{1.7}$.

Referring to FIGS. 5 and 6, it has been found preferable that the rotational centers of the cam and the roller be aligned with a line parallel with the line of travel of the piston.

Figure 8:
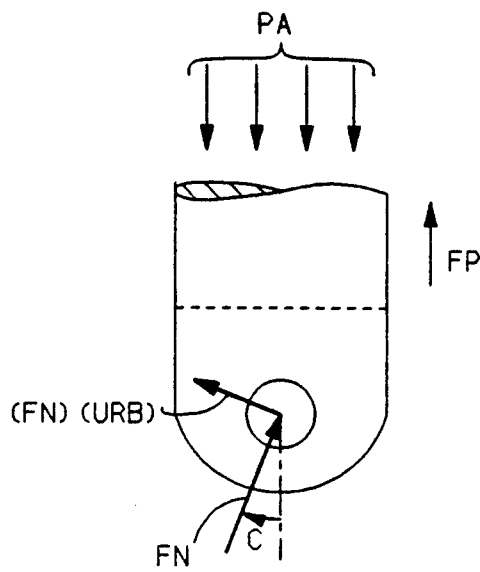

B = cam rotation from BDC
Yo = center distance from cam center to roller at BDC along a line parallel to the travel of the piston
Y = center distance from cam center to roller center at a given cam rotation B along a line parallel to the travel of the piston
C = pressure angle
dy/dB = rate of lift with respect to cam rotation
dY/dB = Y Tan C To derive the force balance on the piston during pressure apply, reference should be made additionally to FIGS. 7 and 8 wherein $$A = \text{Area of the piston}$$
$$= \frac{\pi}{4} D' \text{ where } D = \text{piston diameter}$$

$URB$ = Coefficient of friction of the roller bearing $FP$ = Piston friction force $FN$ = Normal force on the piston $$FN = \frac{(P)(A) + FP}{\cos C - URB(\sin C)}$$

Figure 9:
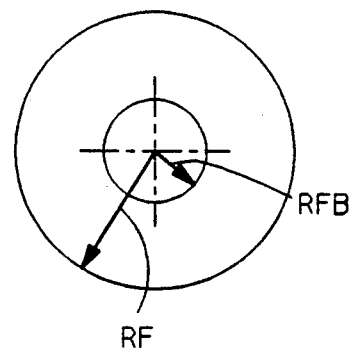

$FC$ = Contact force (normal) between the cam and the roller $FF$ = Friction force between the roller surface and the cam $RF$ = Roller radius (FIG. 9)

$RFB$ = Roller bearing inner radius (FIG. 9)

$$FC = \frac{(P)(A) + FP}{\cos C - URB(\sin C)}$$

$$FF = (URB)(FC)\frac{RFB}{RF}$$

Referring to FIGS. 7, 8 and 9, the relation for cam torque (TC) is as follows:
RB = Cam bearing radius (FIG. 6)
UB = Cam bearing friction coefficient
UC2 = Contact friction coefficient $$TC = FC[Y \sin C + [(URB)(RFB/RF) + UC2]$$
$$[Y \cos C - RF] + (UB)(RB) [[1 +$$
$$[(URB)(RFB/RF) + UC2]^2]^{\frac{1}{2}}]$$

The relationship for motor torque (TM) versus speed is as follows:

$$TM = \frac{TC}{(E)(R)}$$

where
R = Gear ratio
E = Gear box efficiency
Motor speed (NM) is derived s follows:

$$NM = NM \max[1 - TM/TM \max]$$

also $$TM = \frac{1}{(E)(R)} \frac{(P)(A) + FP}{\cos C - (UC1 - UC2)}$$

-continued
$$[Y \sin C + (UC1 + UC2)(Y \cos C - RF) +$$
$$(UB)(RB) [1 + (UC1 + UC2)^2]^{\frac{1}{2}}]$$

where $$UC1 = URB(RFB/RF)$$

Finally, the pressure apply rate (PAR in psi/sec):

$$PAR = (\pi/30)\frac{(K)(A)(Y)(\tan C)(NM)}{R}$$

also $$PAR = (\pi/30)(K)(A)(Y)(\tan C)[(N\max(-TM/TM \max)]$$

where
K = caliper stiffness in PSI/inch$^3$

To optimize the cam design, the P-V characteristic of the caliper (or wheel cylinder in a drum brake) must be determined. Secondly, the piston area (A), roller diameter (RF), gear rotor (R), gear efficiency (E), motor maximum speed (MN max) and torque (TM), maximum cam rotation (typically 315°), maximum pressure angle (C) (typically 35° and minimum increase in motor torque.

Figure 10:
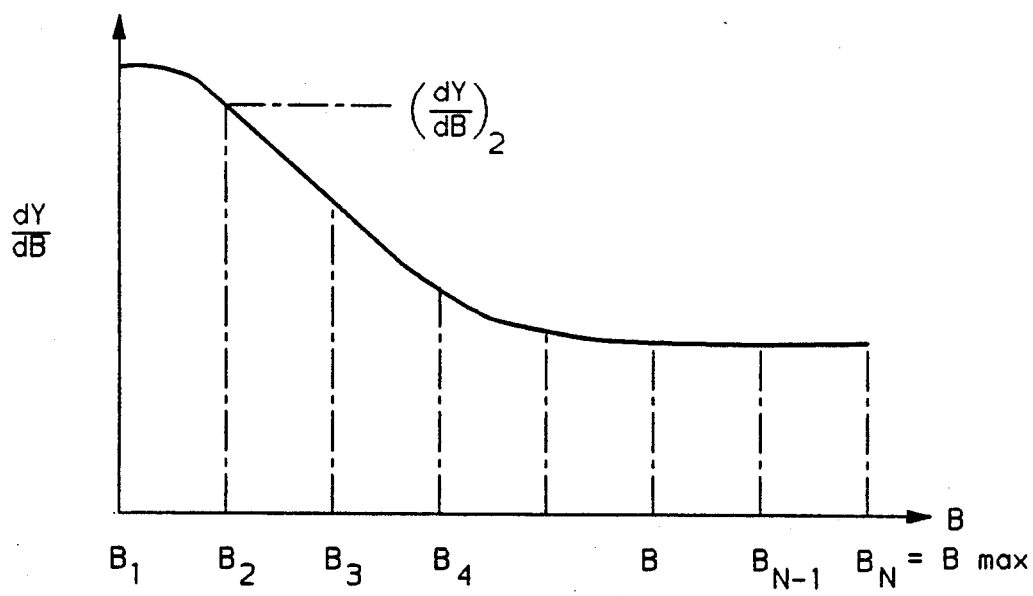
FIG. 10 is a view illustrating the rate of lift with respect to cam rotation.

Thirdly, find $$\left(\frac{dy}{db}\right)_1 \ldots \left(\frac{dy}{db}\right)_N$$

at $C_1, \ldots$ to CN such that $[PAR]_1, \ldots [PAR]_N$ are maximum at $B_1 \ldots B_N$ (FIG. 10).

The above is subject to the following constraints:

1. $C_i = \tan - 1\left[\left[\frac{dy}{db} i\right]\left[\frac{1}{Y_i}\right]\right] \leq C \max, i = 1 \ldots, N$ 2. $Y_N \geq V \max/A$ 3. $B_N \leq B \max$ 4. $\frac{[TM]i - [TM]i - 1}{[TM]i} \geq \Delta TM \; i = 2, \ldots N$ or in other words, a monotonically increasing motor torque.

Forthly, find the optimum cam profile, then change parameters in step 2 and get alternate cam profiles by repeating steps 3 and 4.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A traction control (TC) pressure actuator with fluid connections for a wheel cylinder and a master cylinder via a solenoid valve, said actuator being responsive to a fluid pressure controller, said actuator in combination comprising:
   a frame having a central bore fluidly exposed to said solenoid valve and said wheel cylinder connections;

a piston slidably mounted within said central bore having a contact surface and said piston having a first predetermined position within said central bore;

power means actuated by said controller;

a cam moved by said power means having a ramp surface in contact with said piston contact surface and whereby the position of said piston within said wheel cylinder is determined by the piston of said cam.

2. An actuator as described in claim 1 wherein said cam is a rotary cam.

3. A pressure actuator as described in claim further including said piston having rotatably connected thereto a roller providing the contact surface for said cam.

4. An actuator as described in claim 2 wherein said cam when positioning said piston at said first predetermined position, said piston is at bottom dead center and said piston contact surface has colinear contact with a flat portion of said cam.

5. An actuator as described in claim 1 wherein said braking system has a predetermined pressure versus volume relationship and wherein said cam is profiled to monotonically increase the required torque of said power means with rotation along substantially all of said rotation of said cam from said first to second predetermined positions.

6. An actuator as described in claim 1 wherein said cam is profiled near said first predetermined position to provide rapid motion of said piston to displace an initial volume of said actuator quickly.

7. An actuator as described in claim 1 wherein said braking system has a predetermined pressure versus volume relationship and wherein said cam is profiled to minimize the peak torque required by said power means to rotate said cam for said actuator to reach a desired peak braking system pressure.

8. An actuator as described in claim 3 wherein the center of rotation of said roller is aligned with the center of rotation of said cam.

9. A traction control system (TC) pressure actuator with connections for a wheel cylinder and a master cylinder via a solenoid valve controlled by a fluid pressure controller, said actuator being responsive to said fluid controller, said actuator in combination comprising:

a frame having a central bore fluidly exposed to said solenoid valve and wheel cylinder connections;

a piston slidably mounted within said central bore having a contact surface and said piston having a first predetermined extreme bottom dead center position within said bore and a second predetermined extreme position within said bore opposite said first predetermined position;

power means actuated by said controller; and a cam mounted along a rotary axis moved by said controller, said cam having a ramp surface in contact with said piston contact surface, and said cam having a stop surface whereby the position of said piston within said frame is determined by the position of said cam and whereby said first position said cam stop surface determines the position of said piston and causes power means to signal said controller that said piston is at said first predetermined position.

10. An actuator as described in claim 9 wherein a spring biases said piston to said first predetermined position.

11. A method of modulating the pressure in a traction control system (TC) with an actuator with fluid connections to a wheel cylinder and to a master cylinder via a solenoid valve, said actuator being responsive to a signal given by a fluid pressure controller, said method in combination comprising:

fluidly exposing a frame with a central bore to the solenoid valve and said wheel cylinder;

contacting said piston with a cam having a ramp surface and a stop surface; and powering said cam in response to a signal of said controller, whereby said cam stop surface makes contact with a stop and said controller is signaled that said piston is in a first predetermined position.

* * * * *